(No Model.)
B. McKILLEN.
THRASHING MACHINE.
No. 431,612. Patented July 8, 1890.
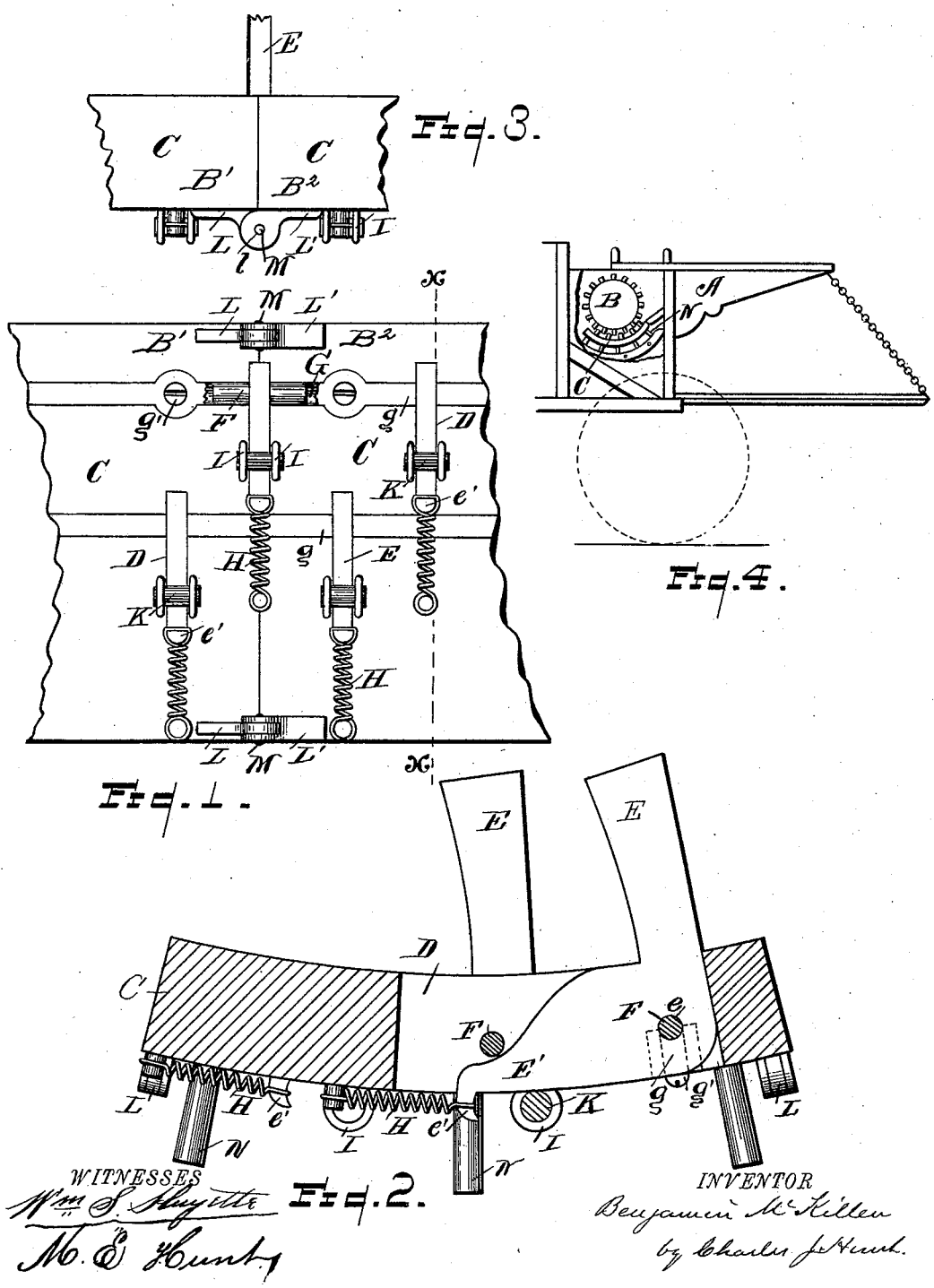
WITNESSES
INVENTOR
Benjamin McKillen
by Charles J. Hunt.
Attorney.

United States Patent Office.

BENJAMIN McKILLEN, OF BAD AXE, MICHIGAN.

THRASHING-MACHINE.

SPECIFICATION forming part of Letters Patent No. 431,612, dated July 8, 1890.

Application filed November 25, 1889. Serial No. 331,419. (No model.)

*To all whom it may concern:*

Be it known that I, BENJAMIN MCKILLEN, of Bad Axe, in the county of Huron and State of Michigan, have invented new and useful Improvements in Thrashing-Machines; and I do hereby declare that the following is a full, clear, and exact description thereof, reference being had to the accompanying drawings, which form a part of this specification.

My invention relates to an improvement in that class of thrashing-machines in which the grain is thrashed from the straw by a revolving cylinder and a concave, both armed with teeth, which pass between each other.

The objects of my invention are, first, to so construct the concave that the teeth may be readily removed and replaced and that the teeth may be capable of a vibratory movement backward and forward; second, to so construct the teeth and connect them to the concave that they can move backward or forward when necessary; third, to so sustain the teeth in their normal position that they will do the ordinary work of thrashing the grain from the straw, but yield for the passage of any solid substance too large to pass between the teeth; fourth, to provide means whereby the teeth will be brought back to their normal position as soon as the deflecting body has passed over them; fifth, to so construct the concave that it will yield in the center when any solid body too large to pass through between the cylinder and the concave accidentally falls into the machine; sixth, to so connect the concave to the main frame or sides of the machine that it will perform its requisite work, but yield when any solid body falls into the machine too large to pass through, and so avoid still greater damage and loss; and it consists in the peculiar construction, arrangement, and combinations of the several parts, as hereinafter more particularly set forth and claimed.

Figure 1 is a plan view of the under side of the concave, the ends being broken off. Fig. 2 is a transverse section of the concave on the line $x$ $x$ in Fig. 1. Fig. 3 is a side elevation of the concave, the ends being broken off. Fig. 4 is an end elevation of a portion of the main frame, showing the cylinder and concave in position.

In the drawings, A represents a portion of the side of a thrashing-machine.

B is a cylinder carrying the beating-teeth of the machine, which are set so as to pass between the stationary teeth on the concave.

C is the concave of the thrashing-machine, placed just below the cylinder B and carrying the stationary teeth. These teeth are placed at the usual distance apart to allow of the passage of the teeth on the cylinder between them.

D D are transverse slots cut in the concave at the proper points for the insertion of the teeth.

E is one of the teeth projecting from the upper face of the concave. The upper or projecting part of these teeth is of the same size and form as the like part in all common thrashing-machines.

E' is a foot projecting to the rear from the tooth E and rests entirely within the slot D when the tooth is in its normal position. The tooth E is perforated at $e$ to permit insertion of the pivot F, which is journaled on each side of the tooth in the groove G, cut in the under side of the concave to receive the pivots on which the teeth vibrate.

$g$ is a cap inserted in the groove G, forming a journal-box for the pivot F. This cap is retained in place by the screw $g'$ or by any other convenient means.

A hook $e'$ projects downwardly from the extreme outer end of the foot E'. A coiled spring H is fastened at one end on the hook $e'$ and at the other to the concave by a screw or stud. Any other spring which will perform the duty of throwing forward the tooth when forced backward by any accident may be used instead of the coiled spring.

I I are loops or brackets projecting from the lower face of the concave—one on each side of every slot—at a proper distance in the rear of the pivot F.

K is a frangible (wooden) pin inserted in the loops I I and under the foot E' of the tooth E to support the tooth in its ordinary use. This pin K should be of such wood as will break when any excessive and sudden force is applied to the tooth, caused by the interposition of any solid body between the teeth of the cylinder and the concave.

L L are brackets cast on one section B' of the concave at and projecting a little beyond its inner end. L' L' are like brackets cast on the other section B² of the concave and interlock with the brackets L L on the section B'. These brackets are perforated at l for the reception of the frangible (wooden) pins M M. These pins should be of such size and timber that they will maintain the connection between the two sections of the concave for all proper purposes.

N N are frangible (wooden) pins inserted in the sides of the thrashing-machine under the ends of the concave B and support it in its proper position in relation to the cylinder A. These pins, as well as the pins M M, should be of such material that they will break if while the machine is at work any solid body falls or is driven between the cylinder and the concave. The breaking of these pins will often prevent great damage and loss without danger to the thrashers.

It is often necessary to remove a part of the teeth of a thrashing-machine in order to thrash different grains and seed, and this can easily and readily be done in my device by taking out the pins supporting the tooth and releasing the spring of the tooth to be removed, allowing the tooth to fall back into the slot.

What I claim as my invention is—

1. In a thrashing-machine, the combination of a concave having a transverse slot for the reception of the tooth, with the yielding tooth pivoted in the slot, the brackets for holding the frangible pin, and the frangible pin to support the tooth in its normal position, substantially as described and shown.

2. In a thrashing-machine, the combination of a concave having a transverse slot for the reception of the tooth, with the yielding tooth pivoted in the slot, the brackets for holding the frangible pin, the frangible pin to support the tooth in its normal position, and the spring to return the tooth to its position after the breaking of the pin, substantially as shown and described.

3. In a thrashing-machine, the combination of the section B' of a concave with the perforated bracket L to interlock with the bracket L', the section B' of the concave, the perforated bracket L' to interlock with the bracket L, and the wooden pin M, inserted in the perforations through the brackets, substantially as shown and described.

4. In a thrashing-machine, the combination of the sectional concave held together by frangible pins, with the frangible pins in the side of the machine to support the sectional concave, the sides of the machine, and the cylinder journaled in the sides of the machine and above the concave, substantially as shown and described.

BENJAMIN McKILLEN.

Witnesses:
ADOLPH WURZBURG,
FRANCIS R. BOSELLY.